United States Patent
Suenaga et al.

(10) Patent No.: US 6,677,072 B2
(45) Date of Patent: Jan. 13, 2004

(54) FUEL CELL

(75) Inventors: Toshihiko Suenaga, Wako (JP); Masajiro Inoue, Wako (JP); Nobuaki Kimura, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 298 days.

(21) Appl. No.: 09/946,035

(22) Filed: Sep. 4, 2001

(65) Prior Publication Data

US 2002/0028370 A1 Mar. 7, 2002

(30) Foreign Application Priority Data

Sep. 4, 2000 (JP) .................... P2000-267765
Oct. 13, 2000 (JP) .................... P2000-314315

(51) Int. Cl.$^7$ .................. H01M 2/00; H01M 2/02; H01M 2/08; H01M 2/14
(52) U.S. Cl. ............. 429/35; 429/34; 429/37; 429/38
(58) Field of Search ............... 429/34, 35, 36, 429/37, 38, 39

(56) References Cited

U.S. PATENT DOCUMENTS 4,283,264 A * 8/1981 Darling et al. ............... 204/252
4,898,653 A * 2/1990 Morris ........................ 205/513
5,618,641 A * 4/1997 Arias ........................... 429/210
6,280,869 B1 * 8/2001 Chen ............................ 429/34
6,495,278 B1 * 12/2002 Schmid et al. ................ 429/30

FOREIGN PATENT DOCUMENTS

JP          2922132          4/1999

* cited by examiner

Primary Examiner—Randy Gulakowski
Assistant Examiner—Don Scaltrito
(74) Attorney, Agent, or Firm—Lahive & Cockfield, LLP

(57) ABSTRACT

A fuel cell is provided where assembly of the seals is facilitated and excellent sealability and miniaturization becomes possible. This is achieved by a fuel cell (N) where an electrode film structure (12) having an anode electrode (A) provided on one side of a solid polymer electrolyte film (15), and a cathode electrode (C) provided on the other side thereof is clamped with an anode-side separator (13) and a cathode-side separator (14), wherein a groove (38) is provided in a surface (13a, 14a) of each separator (13) and (14) corresponding to the outer peripheral portion of the anode electrode (A) or the cathode electrode (C), and a seal (S1) having a circular shape in cross-section and with a fin (F) is provided in this groove (38).

13 Claims, 15 Drawing Sheets

FUEL CELL

RELATED APPLICATIONS

This application claims priority to Japanese Patent Application No. P2000-267765 filed on Sep. 4, 2000 in Japan, and Japanese Patent Application No. P2000-314315 filed on Oct. 13, 2000 in Japan. The contents of the aforementioned applications are hereby incorporated by reference.

BACKGROUND OF THE INVENTION

1. Field of the Invention

The present invention relates to a fuel cell where an electrode film structure comprising a solid polymer electrolyte film with an anode electrode and a cathode electrode on the opposite sides thereof is clamped with a pair of separators. More specifically, the present invention relates to a fuel cell where assembly and sealability between the electrodes and the separators is improved.

2. Description of the Related Art

For example, there has been developed a solid polymer electrolyte type fuel cell constituted by laminating a plurality of units, with one unit being such that an electrode film structure provided with an anode electrode and a cathode electrode at opposite positions with a solid polymer electrolyte film inserted therebetween is clamped by separators, and this has been utilized for various practical applications.

One example of this fuel cell will be described with reference to FIG. 23. In this figure, reference symbol 1 denotes a solid polymer electrolyte film, and on opposite sides of this solid polymer electrolyte film 1, there are respectively arranged an anode electrode 2 and a cathode electrode 3, having a smaller area than that of the solid polymer electrolyte film 1. Sealing members 4 and 5 for gas seal are arranged on the respective outer peripheral portions of the anode electrode 2 and the cathode electrode 3.

The above sealing members 4 and 5 have seal lips 6 provided integrally and protrudingly on respective surfaces opposite to the surface contacting with the solid polymer electrolyte film 1, so as to surround the electrode surface of the anode electrode 2 and the cathode electrode 3.

A separator 8 exhibiting a fuel gas supply function and a power collecting function, and having guide grooves 7 for the fuel gas is arranged on the outside of the anode electrode 2 facing the anode electrode 2, so as to come in contact with the anode electrode 2. Likewise, a separator 10 exhibiting an oxidant gas supply function and a power collecting function and having guide grooves 9 for the oxidant gas is arranged on the outside of the cathode electrode 3 facing the cathode electrode 3, so as to come in contact with the cathode electrode 3.

The thus constructed fuel cells are laminated in a plurality of numbers, and the laminated body is fastened in the lamination direction by a fastening device (not shown) to thereby constitute a fuel cell as a stack.

In the above described fuel cell, differences in thickness between the anode electrode 2 and cathode electrode 3, and the sealing members 4 and 5 can be absorbed by the seal lip 6. As a result, the anode electrode 2 and the separator 8, and the cathode electrode 3 and the separator 10 can be brought into good contact with each other, and hence this feature is excellent in contributing to the improvement of the cell performance (see Japanese Patent No. 2922132).

In the above described prior art however, there is a problem in that it is difficult to set the sealing members 4 and 5 and the anode electrode 2 and the cathode electrode 3 without causing misalignment, at the stage of superimposing the sealing members 4 and 5 on the solid polymer electrolyte film 1. If misalignment occurs between the sealing member 4 on the anode electrode 2 side and the sealing member 5 on the cathode electrode 3 side in the direction along the surface of the solid polymer electrolyte film 1, the positions where the seal lips 6 come close to the separators 8 and 10 shift slightly. As a result, the reaction force for the seal by the seal lips 6 acting on the solid polymer electrolyte film 1 on the base side of the seal lips 6 is biased, and hence an unbalanced force acts on the solid polymer electrolyte film 1, thereby causing problems such as the solid polymer electrolyte film 1 slips or folds occur therein. As a result, a problem occurs in that the dimensional accuracy at the time of assembling the anode electrode 2 and the sealing member 4, and the cathode electrode 3 and the sealing member 5 must be strictly controlled, thereby making production difficult.

Also in the solid polymer electrolyte type fuel cell, even if the solid polymer electrolyte film 1, the anode electrode 2 and the cathode electrode 3 are overlapped, since these are as thin as several hundreds microns in the thickness direction, a sufficient height dimension for the seal lips 6, that is, sufficient elastic deformation cannot be ensured, thereby causing a problem in the sealability.

Moreover, if the margin for compression of the seal lip 6 is increased so as to ensure the sealability, the fastening force in a condition with the fuel cells laminated increases, thereby causing an increase in size of the fastening member, an increase in size of the fastening apparatus, and a problem in that the separators 8 and 10 cannot endure the fastening force and may be damaged.

On the other hand, there is a case where a seal structure is adopted in which a groove is formed in the separator, the sealing members are set stably in the groove without causing misalignment, and the sealing member is closely contacted with the corresponding portion. FIG. 24 and FIG. 25 show this example, wherein a seal S having a seal body having a square shape in cross-section is inserted into a groove 11 in the separators 8 and 10. The seal S has a fin F at a corner thereof, and the insertion stability of the seal S is ensured by this fin F. Therefore, at the time of inserting the seal S into the groove 11, the seal S can be inserted with torsion of the seal S being kept to a minimum. FIG. 24 shows a case where the fin F is provided on the both sides, and FIG. 25 shows a case where the fin F is provided on one side.

In such a structure however, in either case of the seal S shown in FIG. 24 and FIG. 25, when the seal S is inclined, the seal height decreases from H1 to H2, and the load applied to the seal S causes displacement in the direction of compression, as shown by the arrows in the figure, and a moment load acts thereon. As a result, the reaction force for the seal differs depending on the place, causing a problem in that uniform sealability cannot be obtained.

SUMMARY OF THE INVENTION

It is therefore an object of the present invention to provide a fuel cell for which assembly of the seals is facilitated and with excellent sealability, and which enables miniaturization.

In order to solve the above problems, the invention according to a first aspect is characterized by a fuel cell (for example, a fuel cell N in this embodiment) where an electrode film structure (for example, an electrode film structure 12 in this embodiment) having an anode electrode (for example, an anode electrode A in this embodiment) provided on one side of a solid polymer electrolyte film (for example, a solid polymer electrolyte film 15 in this embodiment), and a cathode electrode (for example, a cathode electrode C in this embodiment) provided on the other side thereof is clamped with a pair of separators (for example, a separator 13 on the anode side and a separator 14 on the cathode side in this embodiment), wherein a groove (for example, a groove 38 in this embodiment) is provided on a separator surface corresponding to the outer peripheral portion of the anode electrode or the cathode electrode (for example, surfaces 13*a*, 14*a* in this embodiment), and a seal (for example, a seal S1 in this embodiment) having a circular shape in cross-section and with a fin (for example, a fin F in this embodiment) is provided in this groove.

By having such a construction, it becomes possible to set a high seal height for the seal in the groove and increase the sectional area of the assembled seal. As a result, when the fuel cells are laminated and fastened, the surface pressure change of the seal portion becomes gradual with respect to the compressive load. Therefore there is the effect that differences in the seal stress between the respective fuel cells can be reduced, assembly of the seals is facilitated and excellent sealability can be ensured. As a result, there is the effect that the bending stress on the separators decreases, and damage of the separators can be reliably prevented.

Furthermore by making the seal have a circular shape in cross-section, a low compressive load can be realized and the ratio of the surface area to the volume of the seal can be reduced. Therefore there is the effect that durability with respect to heat, such as compressive permanent deformation can be improved.

Moreover, since it is possible to prevent inclining of the seal by means of the fin, there is the effect that linearity of the seal can be maintained, distortion, slippage and waving at the time of assembly can be eliminated, and alignment of the mounting position is facilitated. Moreover, also in the case where inclining of the seal occurs, since the compression margin of the seal having a circular shape in cross-section does not change, there is the effect that causes of poor sealing can be eliminated.

Furthermore, since it is possible to identify inclining of the seal by means of the visually identifiable direction of the fin, there is the effect that assembly of the seal can be performed quickly, enabling a reduction of manufacturing time. Moreover, when inserting the seal into the groove, insertion can be done by fitting the fin into the groove. Therefore there is the effect that the seal can be inserted appropriately without causing distortion or waving of the seal.

Furthermore, since the fin is formed, and the tensile strength of the seal can be increased by this fin, there is the effect that in the case where adherence to the mold occurs at the time of mold removal after vulcanization molding, even if excessive pulling or stretching is applied at the time of peeling off, occurrence of cuts, cracks and ruptures can be reduced, thereby improving yield.

The invention according to a second aspect is characterized by a fuel cell where an electrode film structure having an anode electrode provided on one side of a solid polymer electrolyte film and a cathode electrode provided on the other side thereof is clamped with a pair of separators, wherein there are provided in the separator, communicating holes for supplying and discharging a reactant gas containing a fuel gas (for example, an inlet side fuel gas communicating hole 22*a* and an outlet side fuel gas communicating hole 22*b* in this embodiment), communicating holes for supplying and discharging a reactant gas containing an oxidant gas (for example, an inlet side oxidant gas communicating hole 23*a* and an outlet side oxidant gas communicating hole 23*b* in this embodiment) and communicating holes for supplying and discharging a coolant (for example, an inlet side coolant communicating hole 24*a* and an outlet side coolant communicating hole 24*b* in this embodiment), penetrating through the separator, and a groove (for example, a groove 39 in this embodiment) is provided around the periphery of at least one of the opposing communicating holes, and a seal (for example, a seal S2 in this embodiment) having a circular shape in cross-section and with a fin is provided in this groove.

By having such a construction, it becomes possible to increase the seal height of the seal in the grooves and increase the sectional area of the assembled seal, as in the first aspect, at the periphery of the communicating holes for supplying and discharging a reactant gas containing a fuel gas, the communicating holes for supplying and discharging a reactant gas containing an oxidant gas and the communicating holes for supplying and discharging a coolant provided in the separator. As a result, when the fuel cells are laminated and fastened, the surface pressure change of the seal portion with respect the compressive load becomes gradual. Therefore there is the effect that differences in the seal stress between each fuel cell can be reduced, and hence the bending stress on the separators decreases, and damage of the separators can be reliably prevented.

Moreover by making the seal a circular shape in cross-section, a low compressive load is realized and the ratio of the surface area to the volume of the seal can be reduced. Therefore there is the effect that durability with respect to heat, such as compressive permanent deformation can be improved.

Furthermore, since it is possible to prevent inclining of the seal by means of the fin, there is the effect that the linearity of the seal can be maintained, distortion, slippage and waving at the time of assembly can be eliminated, and alignment of the mounting position is facilitated. Moreover, also in the case where inclining of the seal occurs, since the compression margin of the seal having a circular shape in cross-section does not change, there is the effect that causes of poor sealing can be eliminated.

Furthermore, since it is possible to identify inclining of the seal by means of the visually identifiable direction of the fin, there is the effect that assembly of the seal can be performed quickly, enabling a reduction of manufacturing time. Moreover, when inserting the seal into the groove, insertion can be done by fitting the fin into the groove. Therefore there is the effect that the seal can be inserted appropriately without causing distortion or waving of the seal.

Furthermore, since the fin is formed, and the tensile strength of the seal can be increased by this fin, there is the effect that in the case where adherence to the mold occurs at the time of mold removal after vulcanization molding, even if excessive pulling or stretching is applied at the time of peeling off, occurrence of cuts, cracks and ruptures can be reduced, thereby improving yield.

The invention according to a third aspect is characterized by a fuel cell obtained as one unit by laminating a plurality of sets of electrode film structures having an anode electrode provided on one side of a solid polymer electrolyte film and a cathode electrode provided on the other side thereof, which are clamped with a pair of separators, wherein a coolant channel (for example, branching channel grooves 35 in this embodiment) is formed between the separators with backsides (for example, surfaces 13b and 14b in this embodiment) abutting each other, and a groove (for example, a groove 39 in this embodiment) is provided in at least one of the separator surfaces (for example, the surface 13b in this embodiment), at a portion surrounding the channel, and a seal having a circular shape in cross-section (for example, a seal S1 in this embodiment) and with a fin is provided in this groove.

By having such a construction, at the periphery of the coolant channel formed between adjacent separators, as in the above described first and second aspects, it becomes possible to increase the seal height of the seal in the groove and increase the sectional area of the assembled seal. Hence, when the fuel cells are laminated and fastened, the surface pressure change of the seal portion becomes gradual with respect to the compressive load. Therefore there is the effect that differences in the seal stress between the respective fuel cells can be reduced, and hence the bending stress on the separators decreases, and damage of the separators can be reliably prevented.

Furthermore by making the seal have a circular shape in cross-section, a low compressive load can be realized and the ratio of the surface area to the volume of the seal can be reduced. Therefore there is the effect that durability with respect to heat, such as compressive permanent deformation can be improved.

Moreover, since it is possible to prevent inclining of the seal by means of the fin, there is the effect that linearity of the seal can be maintained, distortion, slippage and waving at the time of assembly can be eliminated, and alignment of the mounting position is facilitated. Moreover, also in the case where inclining of the seal occurs, since the compression margin of the seal having a circular shape in cross-section does not change, there is the effect that causes of poor sealing can be eliminated.

Furthermore, since it is possible to identify inclining of the seal by means of the visually identifiable direction of the fin, there is the effect that assembly of the seal can be performed quickly, enabling a reduction of manufacturing time. Moreover, when inserting the seal into the groove, insertion can be done by fitting the fin into the groove. Therefore there is the effect that the seal can be inserted appropriately without causing distortion or waving of the seal.

Furthermore, since the fin is formed, and the tensile strength of the seal can be increased by this, there is the effect that in the case where adherence to the mold occurs at the time of mold removal after vulcanization molding, even if excessive pulling or stretching is applied at the time of peeling off, occurrence of cuts, cracks and ruptures can be reduced, thereby improving yield.

The invention according to a fourth aspect is characterized by a fuel cell obtained as one unit by laminating a plurality of sets of electrode film structures having an anode electrode provided on one side of a solid polymer electrolyte film and a cathode electrode provided on the other side thereof, which are clamped with a pair of separators, wherein there are provided in the separator, communicating holes for supplying and discharging a reactant gas containing a fuel gas, communicating holes for supplying and discharging a reactant gas containing an oxidant gas and communicating holes for supplying and discharging a coolant, penetrating through the separator, and a groove is provided around the periphery of at least one of the opposing communicating holes of the separators of the fuel cell with backsides abutting each other, and a seal having a circular shape in cross-section and with a fin is provided in this groove.

By having such a construction, at the periphery of each communicating hole formed between adjacent separators, as in the above described first through third aspects, it becomes possible to increase the seal height of the seal in the groove and increase the sectional area of the assembled seal. Hence, when the fuel cells are laminated and fastened, the surface pressure change of the seal portion becomes gradual with respect to the compressive load. Therefore there is the effect that differences in the seal stress between the respective fuel cells can be reduced, and hence the bending stress on the separators decreases, and damage of the separators can be reliably prevented.

Furthermore by making the seal have a circular shape in cross-section, a low compressive load can be realized and the ratio of the surface area to the volume of the seal can be reduced. Therefore there is the effect that durability with respect to heat, such as compressive permanent deformation can be improved.

Moreover, since it is possible to prevent inclining of the seal by means of the fin, there is the effect that linearity of the seal can be maintained, distortion, slippage and waving at the time of assembly can be eliminated, and alignment of the mounting position is facilitated. Moreover, also in the case where inclining of the seal occurs, since the compression margin of the seal having a circular shape in cross-section does not change, there is the effect that causes of poor sealing can be eliminated.

Furthermore, since it is possible to identify inclining of the seal by means of the visually identifiable direction of the fin, there is the effect that assembly of the seal can be performed quickly, enabling a reduction of manufacturing time. Moreover, when inserting the seal into the groove, insertion can be done by fitting the fin into the groove. Therefore there is the effect that the seal can be inserted appropriately without causing distortion or waving of the seal.

Furthermore, since the fin is formed, and the tensile strength of the seal can be increased by this, there is the effect that in the case where adherence to the mold occurs at the time of mold removal after vulcanization molding, even if excessive pulling or stretching is applied at the time of peeling off, occurrence of cuts, cracks and ruptures can be reduced, thereby improving yield.

The invention according to a fifth aspect is characterized in that a width dimension "a" of the groove is set to a range of from 2.0 to 4.0 mm, and a depth dimension "b" is set to a range of from 0.05 to 1.0 mm.

By having such a construction, it becomes possible to ensure an appropriate compressibility based on the lower limit of the seal diameter that can be manufactured stably, while ensuring the strength of the separator. Therefore there is the effect that the sealability can be ensured without damaging the separator. Moreover, it also becomes possible to clear the restriction on the outer peripheral dimension of the separators and to cope with differences in the minimum seal size. Hence, there is the effect that miniaturization of the fuel cell becomes possible, and the seals can be reliably fitted.

The invention according to a sixth aspect is characterized in that the seal is formed of a seal body having a circular shape in cross-section and a fin extending from the seal body in the width direction of the seal, and a diameter dimension φ of the seal body is set to a range of from 0.5 to 1.6 mm, and a width dimension L of the entire seal is set to a range of from 1.0 to 3.1 mm.

By having such a construction, it becomes possible to set the fin in a range that can be identified visually, and the entire seal can be made with a width dimension that allows misalignment at the time of setting the seal. Hence, there is the effect that the seals can be attached reliably, while visually identifying distortion of the seals.

DESCRIPTION OF THE PREFERRED EMBODIMENTS

Embodiments of the present invention will now be described with reference to the drawings.

Figure 1:
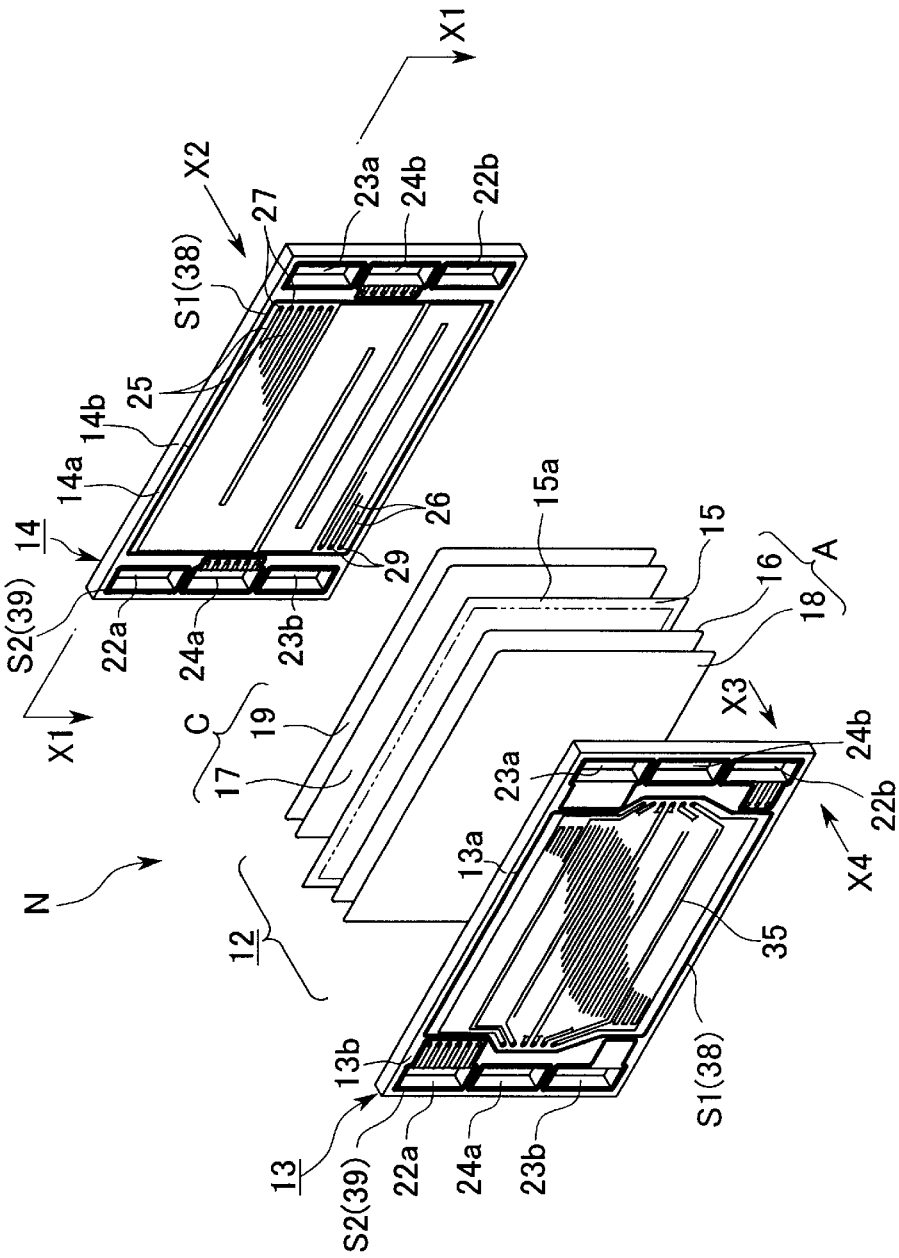
FIG. 1 is an exploded perspective view showing an embodiment of the present invention.
Figure 2:
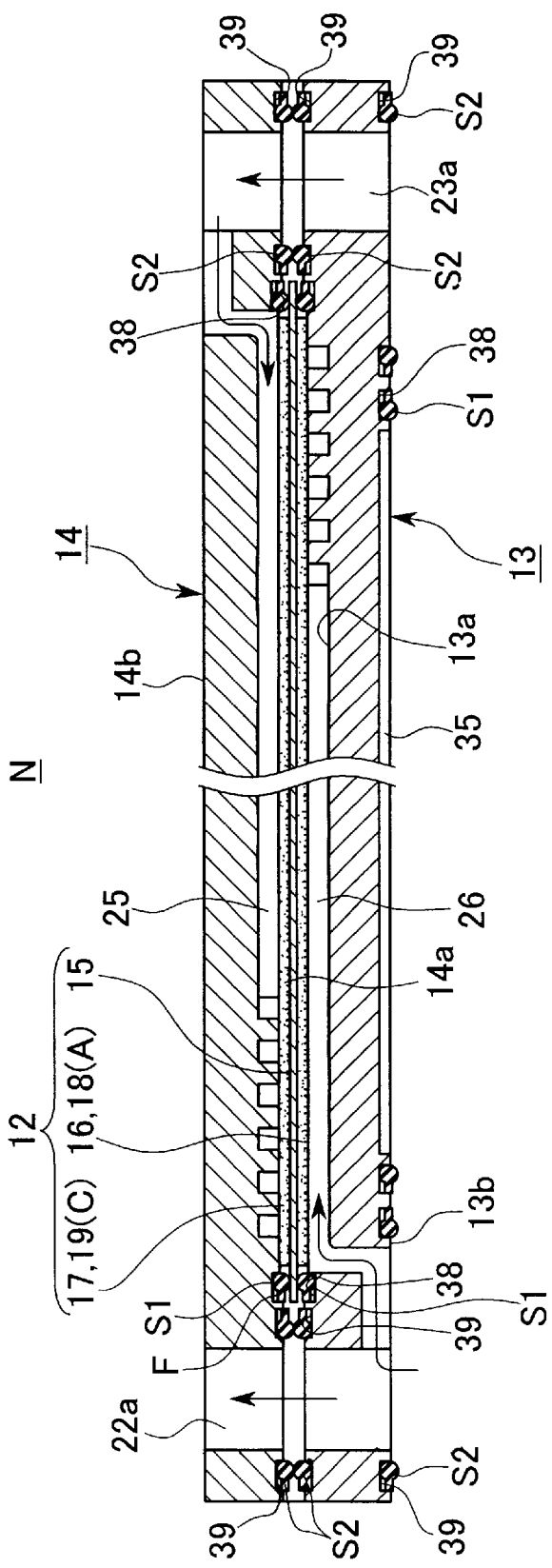
FIG. 2 is a sectional view along the line X1—X1 in FIG. 1, showing the assembled state.

FIG. 1 is an exploded perspective view showing a fuel cell in this embodiment of the present invention. FIG. 2 is a sectional view along the line X1—X1 in FIG. 1. In FIG. 1 and FIG. 2, the fuel cell N comprises an electrode film structure 12, and a separator 13 on the anode side (separator) and a separator 14 on the cathode side (separator), clamping the electrode film structure 12. These are laminated in a plurality of numbers, and for example, are integrated by a fastening mechanism such as bolts and nuts, to thereby constitute a fuel cell for vehicles as a stack.

The electrode film structure 12 has a solid polymer electrolyte film 15, and an anode-side electrode catalytic layer 16 and a cathode-side electrode catalytic layer 17 arranged so that the solid polymer electrolyte film 15 is positioned therebetween, as well as an anode-side porous conductive material 18 and a cathode-side porous conductive material 19 respectively arranged on the outside of the anode-side electrode catalytic layer 16 and the cathode-side electrode catalytic layer 17.

Here, the anode-side porous conductive material 18 and the cathode-side porous conductive material 19 are formed of, for example, a porous carbon paper, a porous carbon cloth or a porous carbon felt. For the solid polymer electrolyte film 15, a perfluorosulfonic acid polymer is used. On the other hand, the anode-side electrode catalytic layer 16 and the cathode-side electrode catalytic layer 17 are mainly composed of platinum. The above described anode-side electrode catalytic layer 16 and anode-side porous conductive material 18 constitute an anode electrode A, and the above described cathode-side electrode catalytic layer 17 and cathode-side porous conductive material 19 constitute a cathode electrode C.

The solid polymer electrolyte film 15 is provided with a protruded portion 15a protruding and extending outwards from the outer peripheral edge of the anode electrode A and the cathode electrode C provided opposed to each other with the solid polymer electrolyte film 15 disposed therebetween. In a position corresponding to this protruding portion 15a, a seal S1 on the anode side and a seal S1 on the cathode side described later are placed from the opposite sides, so as to directly come in close contact with both sides of the protruding portion 15a.

As shown in FIG. 1, the cathode-side separator 14 comprises an inlet side fuel gas communicating hole (communicating hole) 22a for passing the fuel gas such as hydrogen-containing gas, and an inlet side oxidant gas communicating hole (communicating hole) 23a for passing the oxidant gas, being an oxygen-containing gas or air, at the upper part on opposite sides in the lateral direction, located within the plane and at the outer peripheral edge. At the center on opposite sides in the lateral direction of the cathode-side separator 14, there are provided an inlet side coolant communicating hole (communicating hole) 24a for passing the coolant such as pure water, ethylene glycol or oil, and an outlet side coolant communicating hole (communicating hole) 24b for passing the used coolant. Also, within the plane of the cathode-side separator 14, and at the lower part on opposite sides in the lateral direction, there are provided an outlet side fuel gas communicating hole (communicating hole) 22b for passing the fuel gas, and an outlet side oxidant gas communicating hole (communicating hole) 23b for passing the oxidant gas, such that the inlet side fuel gas communicating hole 22a and the inlet side oxidant gas communicating hole 23a are located at diagonal positions.

On the surface (separator surface) 14a of the cathode-side separator 14 facing the cathode electrode C, there are respectively provided a plurality of, for example six, oxidant gas channel grooves 25 independently, in proximity to the inlet side oxidant gas communicating hole 23a, meandering in the horizontal direction in the direction of gravity. These oxidant gas channel grooves 25 join three oxidant gas channel grooves 26, and these oxidant gas channel grooves 26 terminate at a position in proximity to the outlet side oxidant gas communicating hole 23b.

Figure 3:
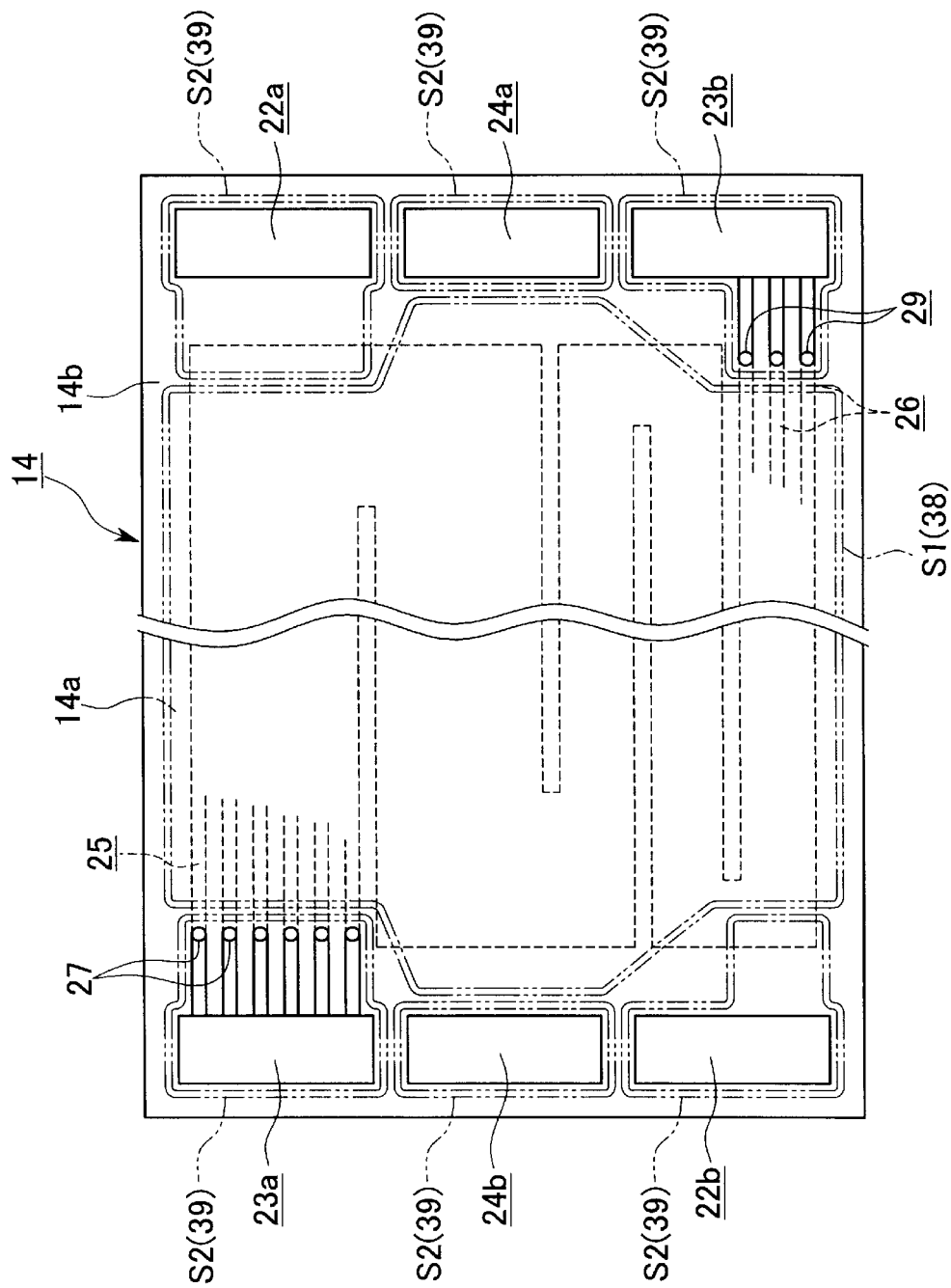
FIG. 3 is a view in the direction of the arrow X2 in FIG. 1.

As shown in FIG. 3, in the cathode-side separator 14, there are provided oxidant gas connecting channels 27, with one end communicating with the inlet side oxidant gas communicating hole 23a on the surface 14b opposite to the surface 14a and the other end communicating with the oxidant gas channel grooves 25 on the surface 14a, and oxidant gas connecting channels 29, with one end communicating with the outlet side oxidant gas communicating hole 23b on the surface 14b and the other end communicating with the oxidant gas channel grooves 26 on the surface 14a, respectively penetrating the cathode-side separator 14.

Figure 4:
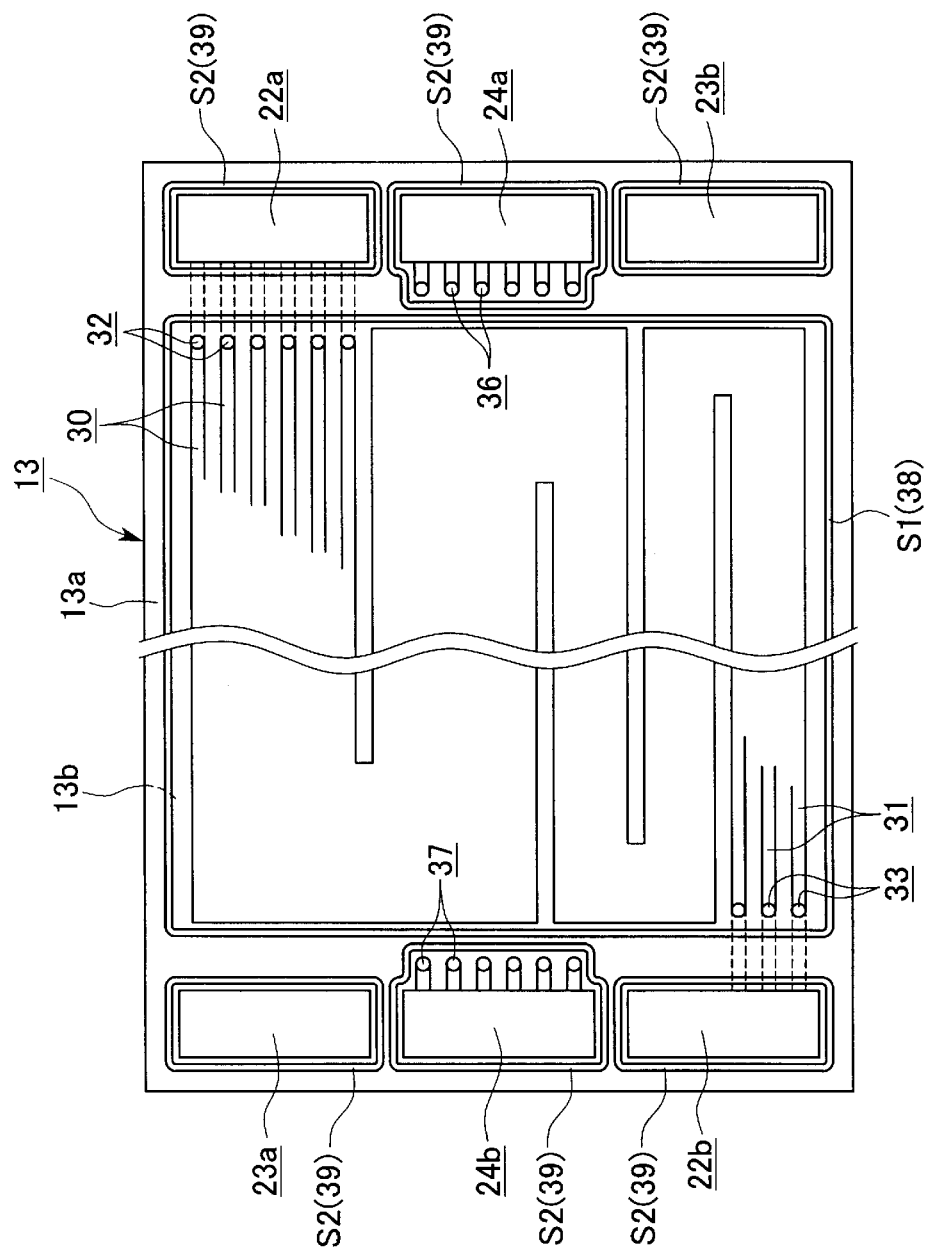
FIG. 4 is a view in the direction of the arrow X3 in FIG. 1.
Figure 5:
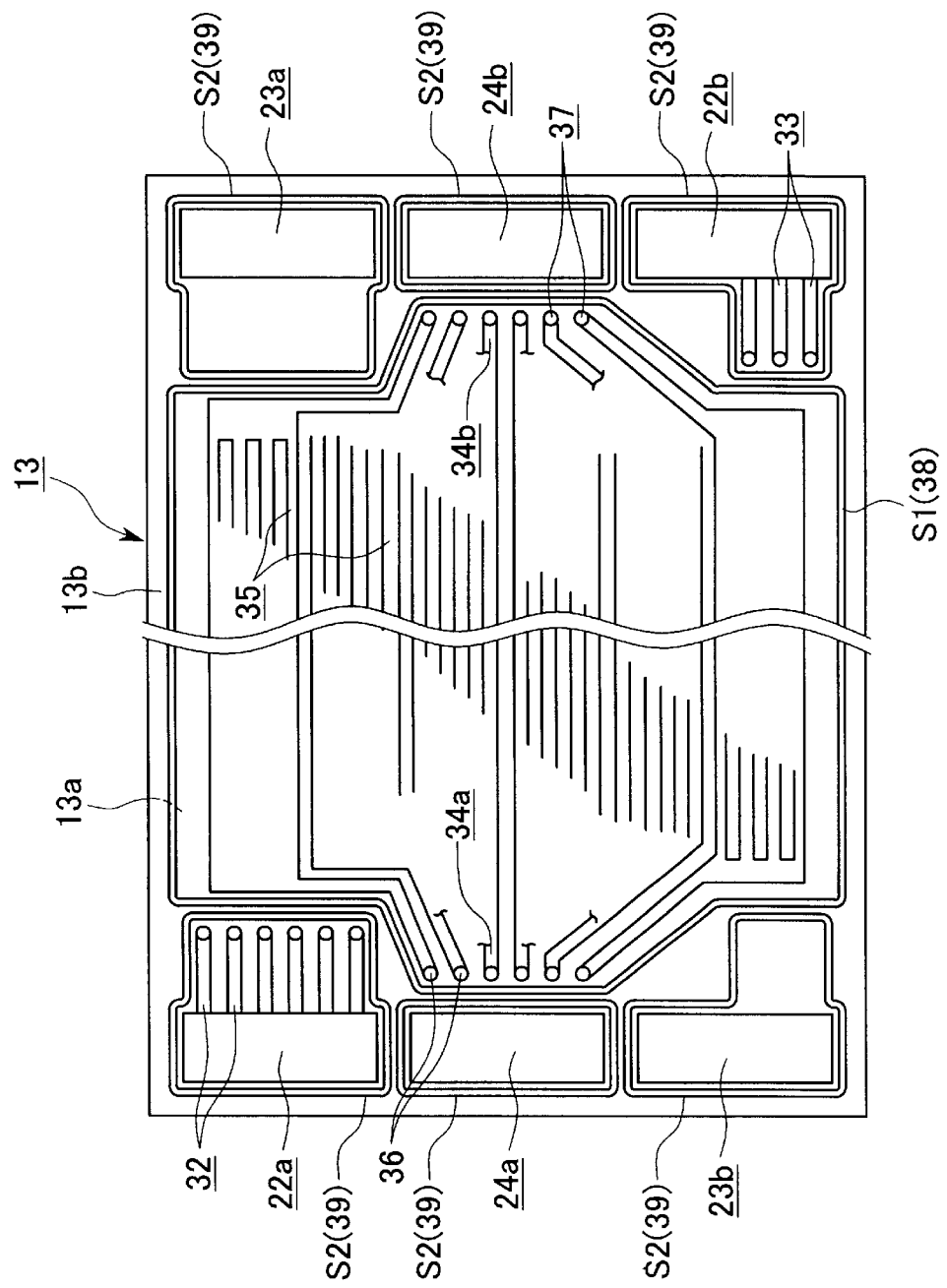
FIG. 5 is a view in the direction of the arrow X4 in FIG. 1.

As shown in FIG. 4 and FIG. 5, on the opposite ends in the lateral direction located within the plane of the anode-side separator 13 and at the outer peripheral edge, as in the cathode-side separator 14, there are formed an inlet side fuel gas communicating hole 22a, an inlet side oxidant gas communicating hole 23a, an inlet side coolant communicating hole 24a, an outlet side coolant communicating hole 24b, an outlet side fuel gas communicating hole 22b, and an outlet side oxidant gas communicating hole 23b.

As shown in FIG. 4, on the surface (separator surface) 13a of the anode-side separator 13, there are provided a plurality of, for example six, fuel gas channel grooves 30 in proximity to the inlet side fuel gas communicating hole 22a. These fuel gas channel grooves 30 extend in the direction of gravity, while meandering in the horizontal direction, and join three fuel gas channel grooves 31. These fuel gas channel grooves 31 terminate in the vicinity of the outlet side fuel gas communicating hole 22b.

In the anode-side separator 13, there are provided fuel gas connecting channels 32 for communicating the inlet side fuel gas communicating hole 22a with the fuel gas channel grooves 30 from the surface 13b side, and fuel gas connecting channels 33 for communicating the outlet side fuel gas communicating hole 22b with the fuel gas channel grooves 31 from the surface 13b side, respectively penetrating the anode-side separator 13.

As shown in FIG. 5, in the surface 13b of the anode-side separator 13, there are formed a plurality of main channel grooves 34a and 34b in proximity to the inlet side coolant communicating hole 24a and the outlet side coolant communicating hole 24b. Between the main channel grooves 34a and 34b, there are respectively provided branching channel grooves (channels) 35 branching into plural numbers, extending in the horizontal direction.

In the anode-side separator 13, there are provided coolant connecting channels 36 for communicating the inlet side coolant communicating hole 24a with the main channel grooves 34a, and coolant connecting channels 37 for communicating the outlet side coolant communicating hole 24b with the main channel grooves 34b, respectively penetrating the anode-side separator 13.

Here, as shown in FIG. 4, a groove 38 is provided in the surface 13a of the anode-side separator 13 facing the outer peripheral portion of the anode electrode A, which clamps the solid polymer electrolyte film 15, at a position corresponding to the protruding portion 15a of the solid polymer electrolyte film 15, and a seal S1 is inserted into this groove 38. There are also formed grooves 39 around the periphery of the inlet side fuel gas communicating hole 22a, the inlet side oxidant gas communicating hole 23a, the inlet side coolant communicating hole 24a, the outlet side coolant communicating hole 24b, the outlet side fuel gas communicating hole 22b and the outlet side oxidant gas communicating hole 23b on the surface 13a of the anode-side separator 13, and seals S2 are inserted into these grooves 39.

Here, the grooves 39 around the inlet side coolant communicating hole 24a and the outlet side coolant communicating hole 24b are formed so as to surround the coolant connecting channels 36 and the coolant connecting channels 37, respectively.

Also, in the surface 14a of the cathode-side separator 14 facing the outer peripheral portion of the cathode electrode C, which clamps the electrode film structure 12 together with the anode-side separator 13, there are formed grooves 38 and 39 at positions corresponding to the grooves 38 and 39 on the surface 13a of the anode-side separator 13, as shown in FIG. 1, and seals S1 and S2 are respectively inserted therein.

Figure 6:
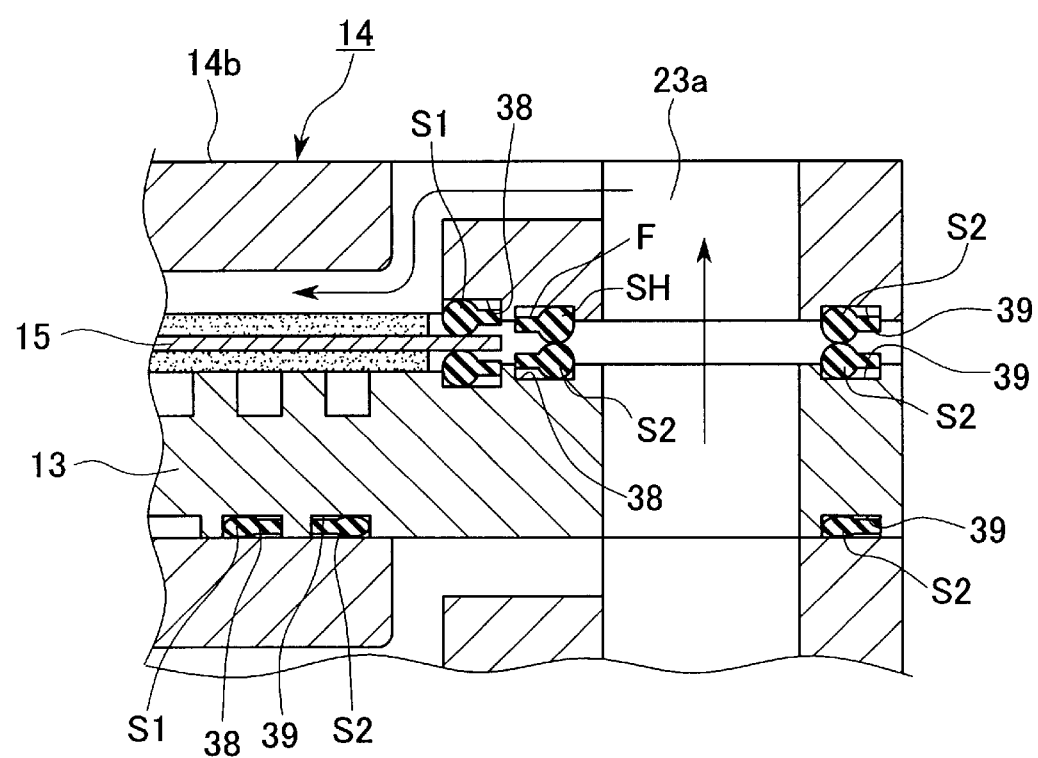
FIG. 6 is an enlarged diagram of the main part in FIG. 2.

Therefore, as shown in FIG. 2 and FIG. 6, respective seals S1 inserted into the grooves 38 of the anode-side separator 13 and the cathode-side separator 14, which clamp the electrode film structure 12, clamp the protruding portion 15a of the solid polymer electrolyte film 15 therebetween at a position facing each other from opposite sides, so as to seal the periphery of the electrode film structure 12. Moreover, respective seals S2 in the grooves 39 contact with each other at the periphery of each communicating hole 22a, 22b, 23a, 23b, 24a and 24b, to thereby seal the periphery thereof.

As shown in FIG. 5 and FIG. 6, in the surface (backside) 13b of the anode-side separator 13, at a position surrounding the periphery of the branching channel grooves 35 being the position facing the surface (backside) 14b of the cathode-side separator 14, which abuts thereagainst when a plurality of fuel cells N is laminated, there is provided a groove 38, and the seal S1 is inserted into this groove 38. There are also provided grooves 39 around the periphery of the inlet side fuel gas communicating hole 22a, the inlet side oxidant gas communicating hole 23a, the inlet side coolant communicating hole 24a, the outlet side coolant communicating hole 24b, the outlet side fuel gas communicating hole 22b and the outlet side oxidant gas communicating hole 23b on the surface 13b of the anode-side separator 13, and seals S2 are inserted into these grooves 39. In FIG. 3, positions where these seals S1 and S2 abut against the surface 14b of the cathode-side separator 14 are shown by two dots chain lines.

In FIG. 5, the grooves 39 around the inlet side fuel gas communicating hole 22a and the outlet side fuel gas communicating hole 22b are formed so as to surround the fuel gas connecting channels 32 and the fuel gas connecting channels 33, respectively. Also, the grooves 39 around the inlet side oxidant gas communicating hole 23a and outlet side oxidant gas communicating hole 23b are provided so as to surround the oxidant gas connecting channels 27 and 29 on the surface 14b of the cathode-side separator 14, as shown in FIG. 3.

In this manner, in the case where the fuel cells N are laminated, when the surface 14b of the cathode-side separator 14 and the surface 13b of the anode-side separator 13 are superimposed, each seal S1 and S2 on the anode-side separator 13 side contacts with the surface 14b of the cathode-side separator, around the inlet side fuel gas communicating hole 22a, the outlet side fuel gas communicating hole 22b, the inlet side coolant communicating hole 24a, the outlet side coolant communicating hole 24b, the inlet side oxidant gas communicating hole 23a and the outlet side oxidant gas communicating hole 23b, and around the branching channel grooves 35. As a result, water-tightness between the anode-side separator 13 and the cathode-side separator 14 is ensured.

The above described seals S1 and S2 will now be described with reference to FIG. 6, in which the main part in FIG. 2 is shown in an enlarged scale. The seals S1 and S2 both have a fin F for restricting tilting of the seal body SH having a circular shape in cross-section, in the grooves 38 and 39. In this embodiment, the fin F is formed so as to extend horizontally on one side, specifically, on the outer peripheral side, of the seal body SH of the seals S1 and S2 formed in an annular shape as shown in FIGS. 1, 4 and 5. The seal body SH and the fins F are inserted together into the grooves 38 and 39. For the material of the seals S1 and S2, a silicone rubber, a fluorine rubber, an ethylene propylene rubber, a butyl rubber or the like is used.

Figure 7:
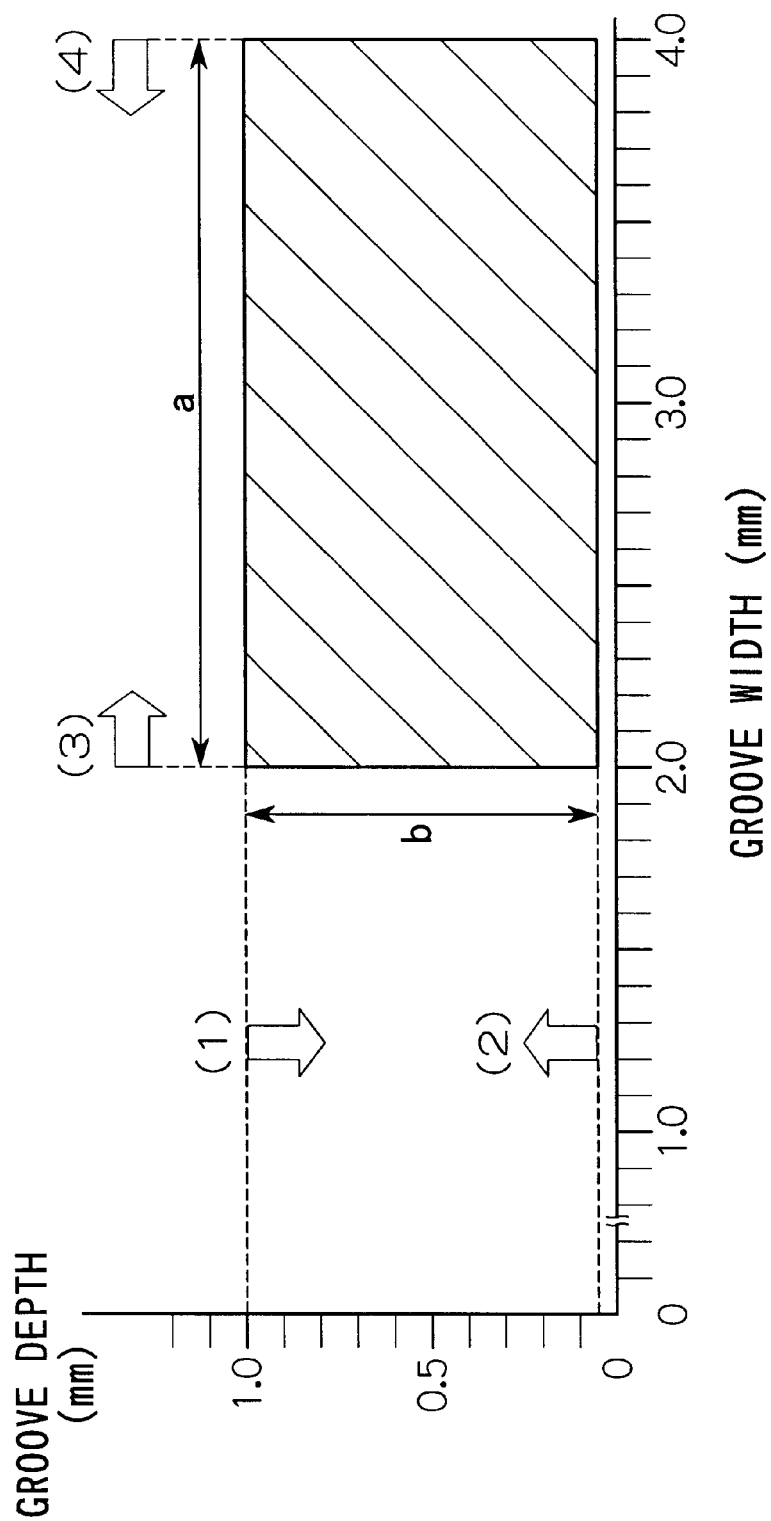
FIG. 7 is a diagram showing the range of section dimensions of a groove.

The dimension of the grooves 38 and 39 and the seals S1 and S2 will now be described. FIG. 7 is a graph showing the range of the groove width "a" and the groove depth "b".

The reason why the dimensions of the groove are restricted is due to the following reasons.

(Depth Dimension of the Groove)

As the depth dimension of the groove increases, the thickness of the separator at the portion of the groove becomes thinner. Therefore, it is necessary to restrict the depth dimension b of the groove, so that the separator is not damaged in the portion of the groove due to the reaction force for the seal. In the case where a carbon type separator is used as in this embodiment, the thickness dimension of the separator is from 2 to 3 mm. Therefore, taking the strength retention limit (1) of the separator into consideration, it is appropriate that the limit of the depth dimension b of the groove is 1 mm.

On the other hand, since the lower limit of the seal diameter that can be stably manufactured is about 0.5 mm, a minimum groove depth of at least 0.05 mm is necessary for the compression amount ensuring limit (2) of the seal, in order to obtain appropriate compressibility of about 20 to 30% even in a seal of this size. Therefore, it is desired that the range of the depth dimension b of the groove be from 0.05 to 1 mm. That is to say, if the depth dimension b of the groove is smaller than 0.05 mm, the compression amount of the seal S1 or S2 cannot be ensured, and if the depth dimension b of the groove is larger than 1 mm, the strength of the separator cannot be ensured. In the case where the separator is made of a metal having a higher strength than that of a carbon type material, the above described strength retention limit (1) is broadened, and the depth dimension b can be further increased.

(Width Dimension of the Groove)

Taking into consideration differences in seal sizes and differences in installation in the groove, a margin of about 0.5 mm is necessary on one side with respect to the seal diameter. The lower limit of the seal diameter that can be stably manufactured is about 0.5 mm, and if a margin dimension of 0.5 mm on one side, that is, of 1.0 mm on both sides is ensured, and in the seal in this embodiment, if a width dimension of 0.5 (mm) of the fin described later is added, a required minimum width (3) of about 2.0 mm becomes necessary.

On the other hand, from a requirement for restricting the peripheral dimension (4) of the separator in order to miniaturize the power generation part, the maximum width dimension "a" of the groove that can be ensured is 4.0 mm at most in the current state.

Accordingly, it is desired that the range of the width dimension "a" of the groove be from 2.0 to 4.0 mm. That is to say, if the width dimension "a" of the groove is smaller than 2.0 mm, differences in seal sizes cannot be coped with, and if larger than 4.0 mm, the separator becomes large.

The cross-section shape of the seals S1 and S2 and the dimensions of each part will now be described.

Figure 8:
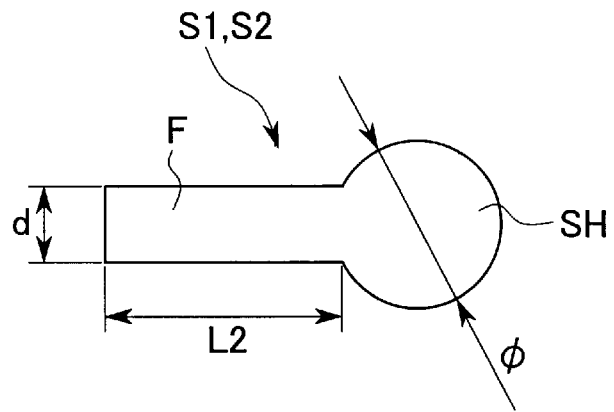
FIG. 8 is a dimensional drawing of a seal in the above embodiment.

FIG. 8 shows the seals S1 and S2 in this embodiment of the present invention, with a fin F provided on one side of the seal body SH. In FIG. 8, $\phi$ denotes a diameter of the seal body SH, L2 denotes a length of the fin F, and d denotes a thickness of the fin F.

Figure 9:
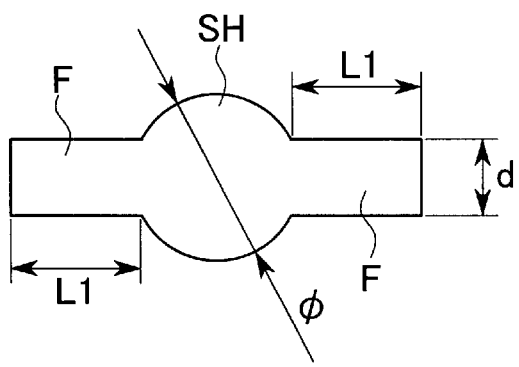
FIG. 9 is a dimensional drawing of a seal in an other embodiment of the present invention.

FIG. 9 shows an other embodiment of the present invention wherein fins F are provided on the both sides of the seal body SH. In FIG. 9, $\phi$ denotes a diameter of the seal body SH, L1 denotes a length of the fin F, and d denotes a thickness of the fin F.

The dimension of each part of the seal, in particular, the dimension of the fin F is determined from the following reasons.

(Width Dimension of the Fin)

When the fin F is inserted with the seal distorted, the fin F will become wavy due to the distortion. By using this to identify the fin F condition, it can be judged if the insertion state of the seal is appropriate. Therefore, in order to exhibit the above function, it is necessary to make the fin F with a minimum width where this can be observed visually. As shown in FIG. 9, in the case where fins F are provided on both sides, each fin F must have the minimum width where this can be observed visually. Hence for the whole fin F a width twice as wide as the width L1 is necessary.

Corresponding to this, in the seal in this embodiment in which the fin F is provided only on one side, it is necessary to make the width L2 of the fin F to be 2L1, as shown in FIG. 8. That is, in order to exhibit the same function of restricting tilting of the seal using two fins F as shown in FIG. 9, it is necessary that the width L2 of the fin F in FIG. 8 is twice as wide as the width L1 of the fin F on one side.

Since the minimum width at which it possible to visually judge the distortion of the fin F is about 0.25 mm, in the case where the fin F is provided on one side as shown in FIG. 8, for the width dimension L2 a width of twice 0.25, that is 0.5 mm is required for the width L2. Hence, considering a margin of about 1.0 mm (0.9 to 1.0 mm) taking misalignment at the time of setting the seal into consideration, the width dimension L2 of the fin F becomes from 0.5 to 1.5 mm.

Considering that the diameter dimension $\phi$ of the seal body SH that can be stably manufactured is from 0.5 mm to 1.6 mm at maximum, the width dimension L of the whole seal having a fin F on one side becomes from 1.0 to 3.1 mm.

In the case where the thickness of the electrode (cathode or anode) is 0.25 mm, if the diameter dimension $\phi$ is 1.7 mm or more, it is necessary that the groove depth is 1 mm or more in order to give the appropriate compression amount (about 25%) to the seal. Hence there is the possibility of damaging the separator. Therefore the maximum value of the diameter dimension $\phi$ of the seal body SH is designated as 1.6 mm.

On the other hand, as shown in FIG. 9, in the case of the seal having the fins F on both sides, considering that the width dimension L1 of each fin F becomes half the size of the margin, the width dimension L1 becomes 0.25 to 0.75 mm. Hence, for the entire seal, the width dimension L becomes 1.0 to 3.1 mm, as in the case having the fin F on one side.

(Thickness Dimension of the Fin)

With regard to the thickness dimension of the fin, 0.15 mm is required for a thickness that suppresses distortion and is not damaged by deforming after vulcanization molding. Also, in order not to exert a large influence on the compressive load, preferably the thickness of the fin F is about the diameter dimension φ of the seal body SH×0.3 to 0.5. Hence, from a diameter dimension φ of the seal body SH of from 0.5 to 1.6, the thickness of the fin F becomes 0.15 to 0.8 mm.

Figure 10:
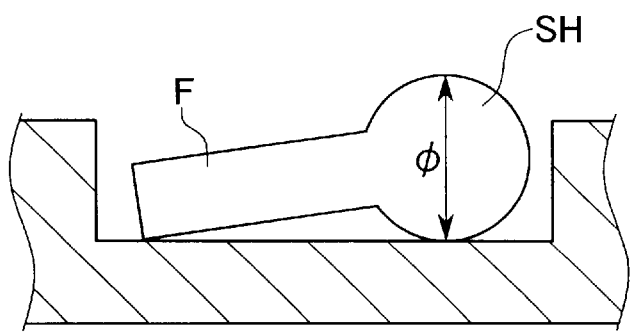
FIG. 10 is a diagram showing a state with the seal in the above embodiment inclined.
Figure 11:
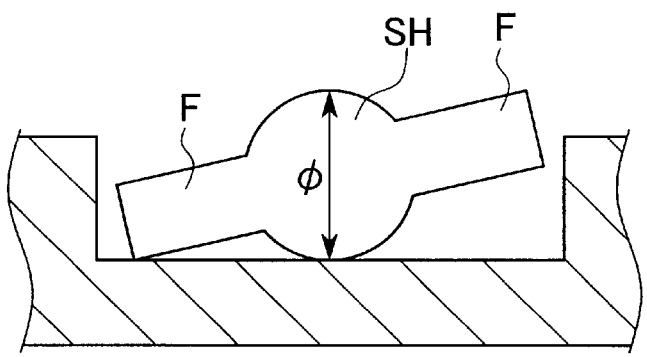
FIG. 11 is a diagram showing a state with the seal in the other embodiment inclined.

Next is a description of a case with reference to FIG. 10 and FIG. 11 of where the seal has inclined. FIG. 10 shows a state where a seal having a fin F on one side has inclined. When the seal has inclined, the inclining of the seal body SH is stopped at a certain position by means of the fin F. At this time, since the seal body SH has a circular shape in cross-section, the diameter dimension φ of the seal body SH becomes the height of the seal, regardless of the degree of inclination, and hence the seal height does not change. The same thing can be said for the case of the seal of FIG. 11, having fins F on both sides of the seal body SH.

Figure 24:
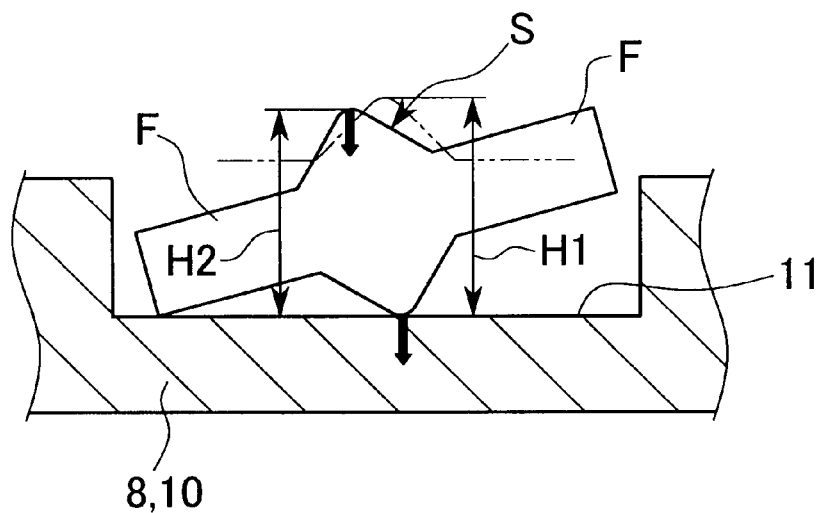
FIG. 24 is a sectional view of a prior art seal incorporating a seal body having a square shape in cross-section.
Figure 25:
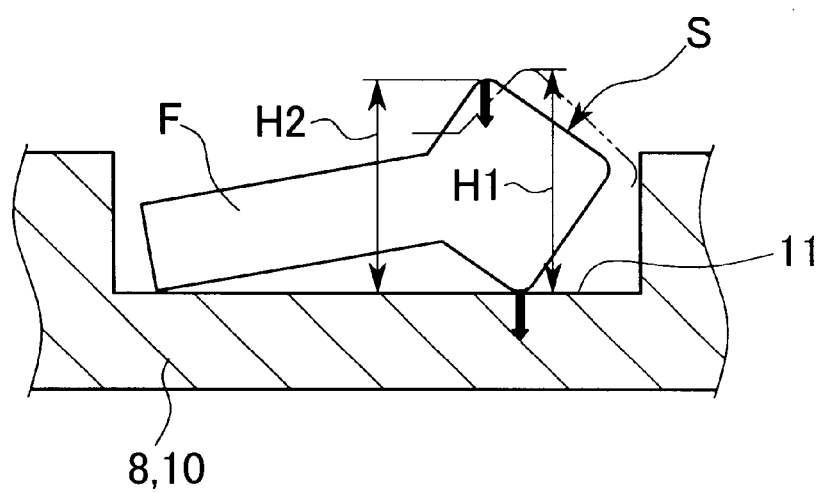
FIG. 25 is a sectional view of a prior art seal incorporating a seal body having a square shape in cross-section.

As described above, by making the seal body SH a circular shape in cross-section, the seal height does not change (from H1 to H2) as with the conventional seal S having a seal body of a square shape in cross-section as shown in FIG. 24, depending on the degree of inclination of the seal S. That is to say, the compressibility of the seal does not change, thereby ensuring a constant reaction force for the seal.

Experimental results for compressive load characteristics will now be described.

Figure 12:
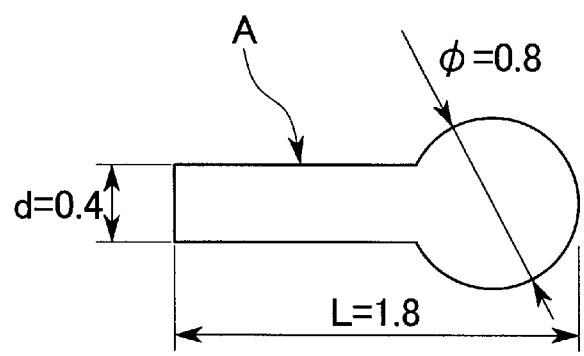
FIG. 12 is a dimensional drawing of a seal A, being a sample in the above embodiment.
Figure 13:
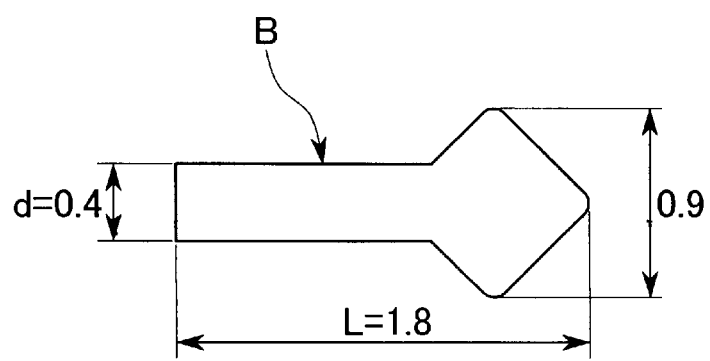
FIG. 13 is a dimensional drawing of sample B corresponding to the prior art.

As samples, a seal A having a fin F on one side corresponding to the embodiment of the present invention as shown in FIG. 12, and a seal B corresponding to the prior art as shown in FIG. 13 are used.

The dimension of each part is as described below.

For both the seal A and seal B, the width dimension L of the seal is 1.8 mm, and the thickness dimension d of the fin is 0.4. In the seal A, the diameter dimension φ, being the seal height, is designated as 0.8 mm, and in the seal B, the seal height is designated as 0.9 mm. The reason why the seal height in the seal B is designated as 0.9 mm is that if this is made the same height as that of the seal A, the sectional areas of the seals differ largely. In order to correct this and make the sectional areas substantially the same, the height of the seal B is set higher by 0.1 mm.

Figure 14:
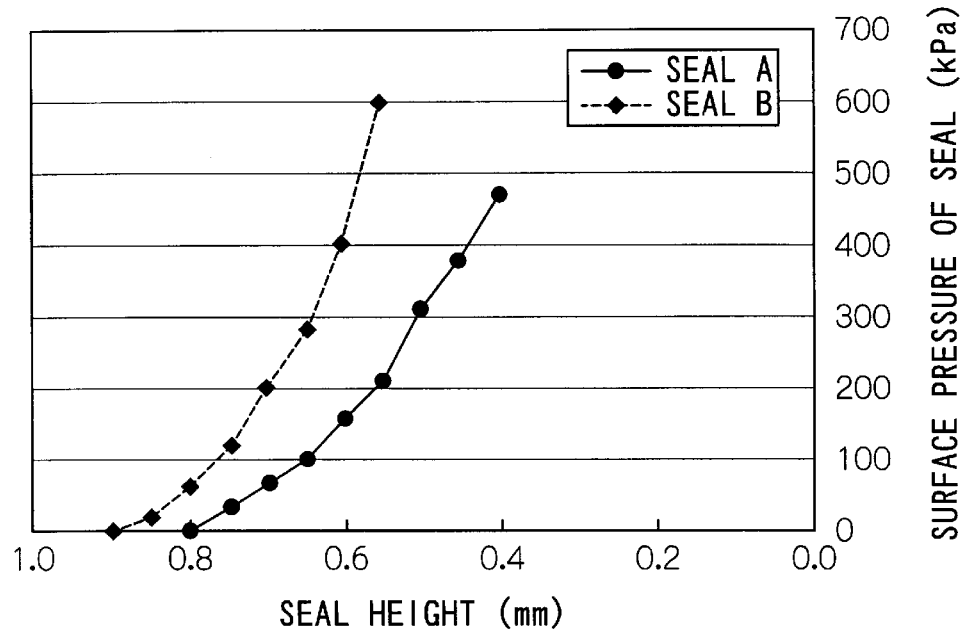
FIG. 14 is a graph showing compressive load characteristic results.

FIG. 14 shows the measurement results. The measurement results show the relation between the surface pressure (kPa) of the seal and the seal height (mm) for the seal A and the seal B. According to this graph, the gradient for the seal B is larger than that for the seal A, and the rise in the surface pressure is thus larger for the seal B.

Accordingly, the seal A is advantageous in that the rise in the surface pressure is small.

Figure 15:
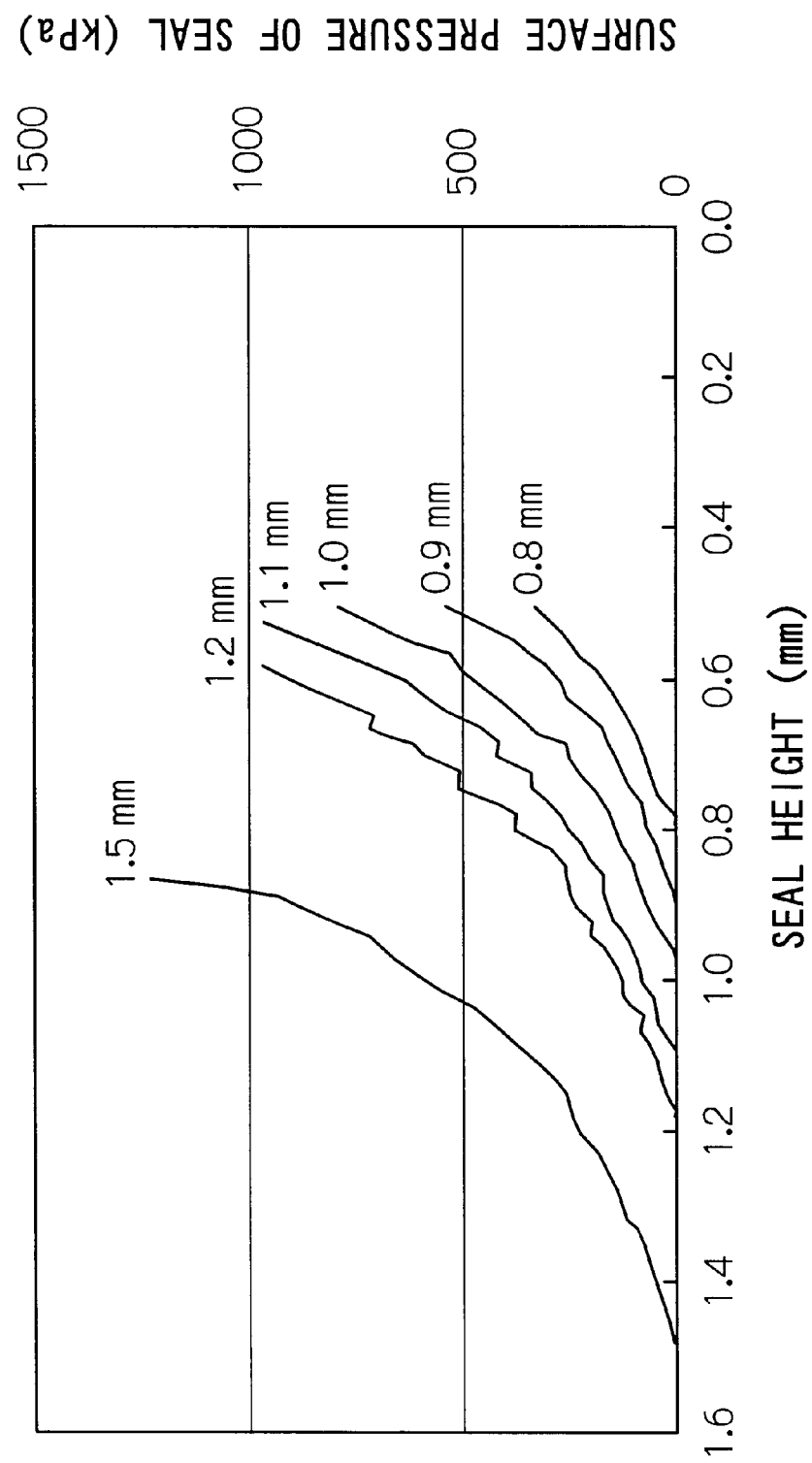
FIG. 15 is a graph showing compressive load characteristics of a seal having a circular shape in cross-section.

FIG. 15 shows experimental results related to compressive load characteristics for the seal A having a circular shape in cross-section. This shows change in the surface pressure (kPa) in the case where the diameter dimension φ (mm) of the seal body is changed. For the diameter dimension of the seal body, seal bodies having a diameter of 0.8, 0.9, 1.0, 1.1, 1.2 and 1.5 are used.

From these experimental results, it is seen that even if the diameter increases, an abrupt change in the load characteristics does not occur.

Figure 16:
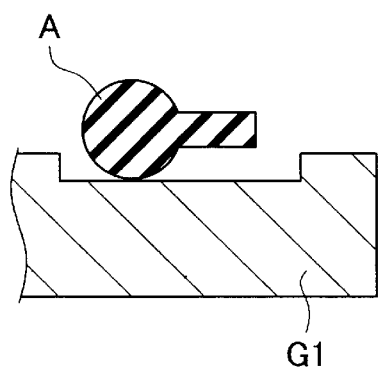
FIG. 16 is a diagram showing a surface pressure measurement method.
Figure 17:
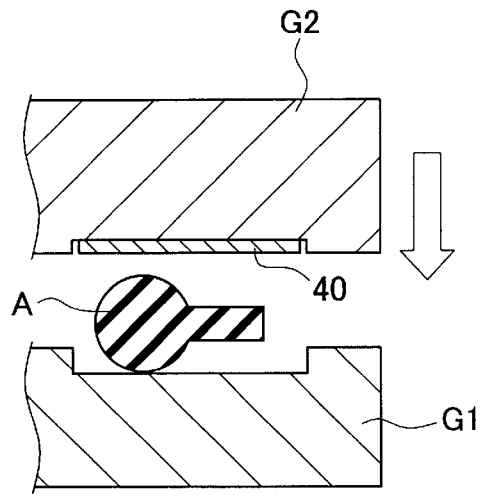
FIG. 17 is a diagram showing a surface pressure measurement method.

Here, in the case of measuring the surface pressure in FIG. 14 and FIG. 15, as shown in FIG. 16, the seal A is set in a groove of a lower jig G1, and a surface pressure sensor 40 is set in a mounting groove of an upper jig G2, as shown in FIG. 17, and the upper jig G2 is lowered vertically from directly above the seal A to thereby measure the resultant surface pressure.

Figure 18:
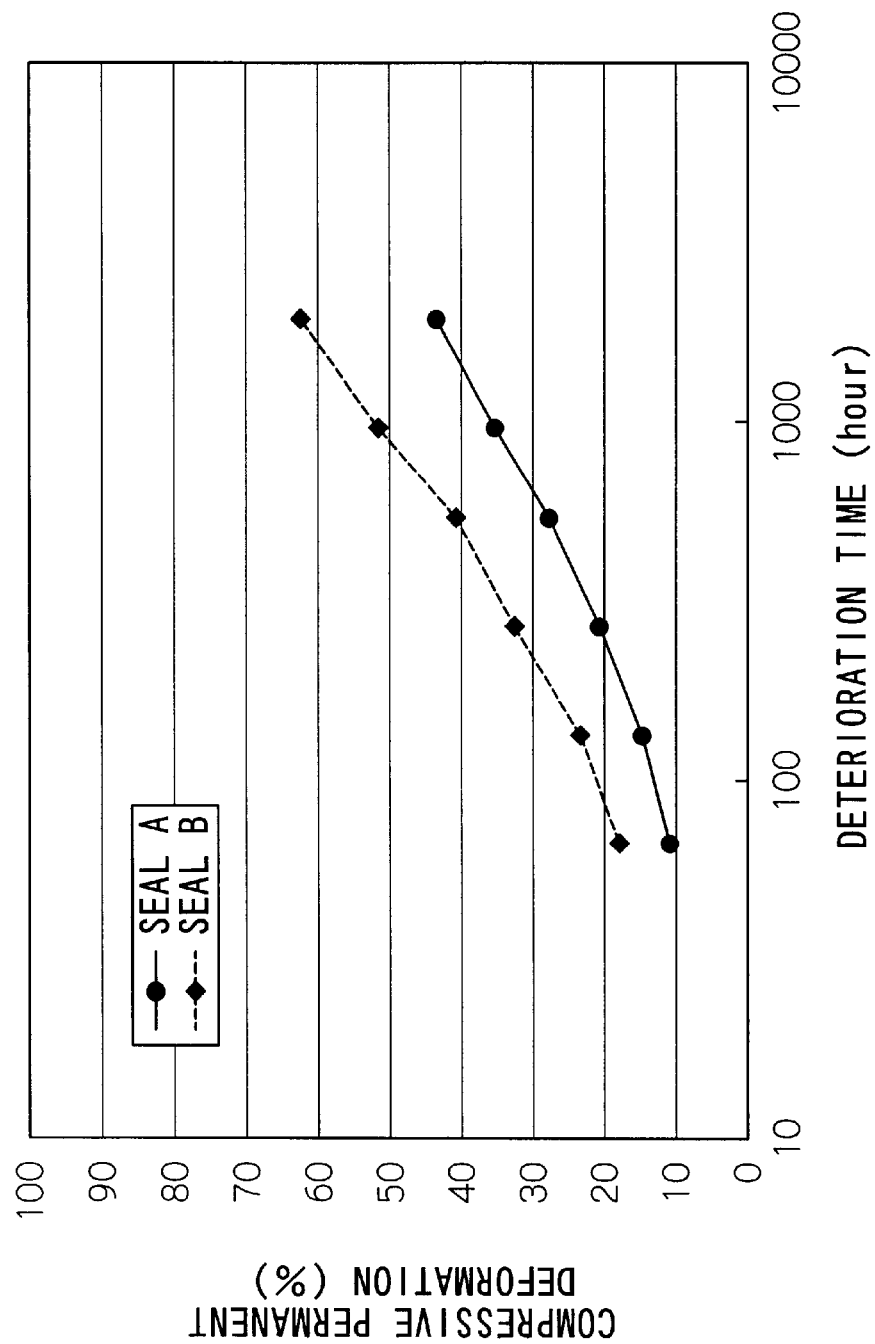
FIG. 18 is a graph showing compressive permanent deformation.

Next, as shown in FIG. 18, there is shown experimental results related to compressive permanent deformation of the seal A and the seal B (both are made of the same material). Here, compressive permanent deformation is deformation in the case where the compressed state remains and the seal does not return to the original shape.

Figure 19:
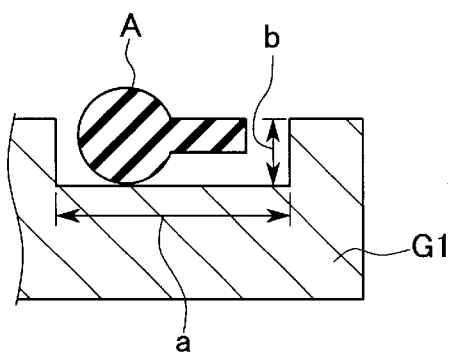
FIG. 19 is a diagram showing a test method for compressive permanent deformation.

As shown in FIG. 19, a groove having a width "a" of 3.5 mm and a depth "b" of 0.6 mm is formed in the lower jig G1, and the seal is inserted in the groove. Then, as shown in FIG. 20, the upper jig G2 is assembled thereon, and the seal is compressed by 25% in the height direction and the jigs G1 and G2 are secured.

Figure 20:
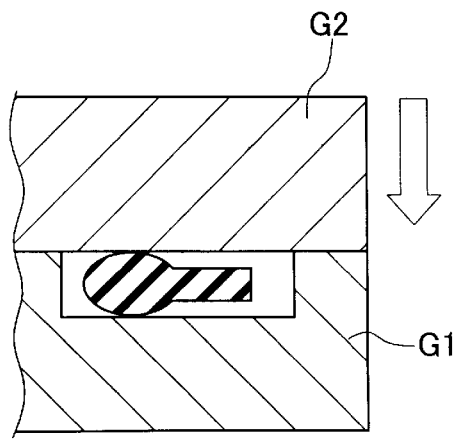
FIG. 20 is a diagram showing a test method for compressive permanent deformation.

Specifically, the seal bodies of the seal A and the seal B (only the seal A is shown in FIG. 19 and FIG. 20) are compressed down to 0.6 mm.

Then, in the compressed condition, the seals are placed in a constant temperature bath to cause heat aging. After treating for prescribed time at 100° C., the seals are taken out, and the seal height after release is compared with the initial height to thereby determine the compressive deformation. According to these experimental results, as shown in FIG. 18, when the seal A and the seal B are compared, it is found that the compressive permanent deformation (%) of the seal B is larger than that of the seal A, for the same deterioration time (unit, time (hour)). Hence, the case where the seal body has a circular shape in cross-section is advantageous in that the compressive permanent deformation is small.

According to the embodiment of the present invention, there are the following effects.

The seals S1 provided with the fin F for restricting tilting of the seal body SH having a circular shape in cross-section are inserted in the groove 38 on the surface 13a of the anode-side separator 13 and the groove 38 on the surface 14a of the cathode-side separator 14, so that the protruding portion 15a of the solid polymer electrolyte film 15 is sandwiched therebetween.

Therefore, it becomes possible to increase the seal height of the seal S1 in the groove 38 and increase the sectional area of the assembled seal S1. As a result, when the fuel cells N are laminated and fastened, the surface pressure change of the seals S1 becomes gradual with respect to the compressive load between the respective separators 13 and 14. Therefore there is the effect that differences in the seal stress between the respective fuel cells N can be reduced in the protruding portion 15a of the solid polymer electrolyte film 15, assembly of the seals S1 is facilitated and excellent sealability can be ensured. Moreover, there is the effect that slipping or folding does not occur in the solid polymer electrolyte film 15, the bending stress on each separator 13 and 14 decreases, and damage of each separator 13 and 14 can be reliably prevented.

Furthermore by making the seal S1, that is, the seal body SH a circular shape in cross-section, a low compressive load is realized and the ratio of the surface area to the volume of the seal S1 can be reduced. Therefore there is the effect that durability with respect to heat, such as compressive permanent deformation can be improved.

Moreover, since it is possible to prevent inclining of the seal S1 by means of the fin F, there is the effect that linearity of the seal S1 can be maintained, distortion, slippage and waving at the time of assembly can be eliminated, and alignment of the mounting position is facilitated. Moreover, also in the case where inclining of the seal S1 occurs, since the compression margin of the seal body SH having a circular shape in cross-section does not change, there is the effect that causes of poor sealing can be eliminated.

Furthermore, since it is possible to identify inclining of the seal S1 by means of the visually identifiable direction of the fin F, there is the effect that assembly of the seal S1 can be performed quickly, enabling a reduction of manufacturing time. Moreover, when inserting the seal S1 into the groove 38, insertion can be done by fitting the fin F into the groove 38. Therefore there is the effect that the seal S1 can be inserted appropriately without causing distortion or waving of the seal S1.

Furthermore, since the fin F is formed, and the tensile strength of the seal S1 can be increased by this, there is the effect that in the case where adherence to the mold occurs at the time of mold removal after vulcanization molding, even if excessive pulling or stretching is applied at the time of peeling off, occurrence of cuts, cracks and ruptures can be reduced, thereby improving yield.

Since the fin F is provided on the outer peripheral side of the seal body SH, there is merit in that the area of the solid polymer electrolyte film 15 can be reduced by the amount that the seal body SH exists on the inner peripheral side.

Moreover, at the outer peripheral edge on the side portion of the anode-side separator 13 and the cathode-side separator 14, there are provided the inlet side fuel gas communicating hole 22a and the outlet side fuel gas communicating hole 22b for supplying and discharging a reactant gas containing a fuel gas, the inlet side oxidant gas communicating hole 23a and the outlet side oxidant gas communicating hole 23b for supplying and discharging a reactant gas containing an oxidant gas and the inlet side coolant communicating hole 24a and the outlet side coolant communicating hole 24b for supplying and discharging a coolant, penetrating through the separator, and grooves 39 are provided around the periphery of at least one of each communicating hole 22a, 22b, 23a, 23b, 24a and 24b facing the solid polymer electrolyte film 15 side, and the seal S2 on which a fin F for restricting tilting is provided on the seal body SH having a circular shape in cross-section is inserted in this groove.

Therefore, it becomes possible to increase the seal height of the seal S2 in the grooves 39 and increase the sectional area of the assembled seal S2 as described above, at the periphery of each communicating hole 22a, 22b, 23a, 23b, 24a and 24b. As a result, when the fuel cells N are laminated and fastened, the surface pressure change of the seals S2 with respect the compressive load becomes gradual between the respective separators 13 and 14. Therefore there is the effect that differences in the seal stress between each fuel cell N at the periphery of each communicating hole 22a, 22b, 23a, 23b, 24a and 24b can be reduced, assembly of the seals S2 is facilitated, and excellent sealability can be ensured. Moreover, there is the effect the bending stress on each separator 13 and 14 decreases, and damage of the separators 13 and 14 can be reliably prevented.

Moreover by making the seal S2, that is, the seal body SH a circular shape in cross-section, a low compressive load is realized and the ratio of the surface area to the volume of the seal S2 can be reduced. Therefore there is the effect that durability with respect to heat, such as compressive permanent deformation can be improved.

Furthermore, since it is possible to prevent inclining of the seal S2 by means of the fin F, there is the effect that the linearity of the seal S2 can be maintained, distortion, slippage and waving at the time of assembly can be eliminated, and alignment of the mounting position is facilitated.

Moreover, also in the case where inclining of the seal S2 occurs, since the compression margin of the seal body SH having a circular shape in cross-section does not change, there is the effect that causes of poor sealing can be eliminated.

Furthermore, since it is possible to identify inclining of the seal S2 by means of the visually identifiable direction of the fin F, there is the effect that assembly of the seal S2 can be performed quickly, enabling a reduction of manufacturing time. Moreover, when inserting the seal S2 into the groove 39, insertion can be done by fitting the fin F into the groove 39. Therefore there is the effect that the seal S2 can be inserted appropriately without causing distortion or waving of the seal S2.

Furthermore, since the fin F is formed, and the tensile strength of the seal S2 can be increased by this, there is the effect that in the case where adherence to the mold occurs at the time of mold removal after vulcanization molding, even if excessive pulling or stretching is applied at the time of peeling off, occurrence of cuts, cracks and ruptures can be reduced, thereby improving yield.

Furthermore, when the fuel cells N are laminated, the seal S1 is inserted into the groove 38 provided in the portion surrounding the branching channel grooves 35 on the anode-side separator 13, of the anode-side separator 13 and the cathode-side separator 14 for which the backsides thereof, that is, the surface 13b and the surface 14b are abutted with each other, and the seals S2 are inserted into the grooves 39 around the inlet side fuel gas communicating hole 22a, the outlet side fuel gas communicating hole 22b, the inlet side oxidant gas communicating hole 23a and the outlet side oxidant gas communicating hole 23b, and the inlet side coolant communicating hole 24a and the outlet side coolant communicating hole 24b, with each of the seals S1 and S2 closely contacted with the surface 14b of the cathode-side separator 14.

Therefore, also for the seals S1 and S2 inserted into these grooves 38 and 39, as described above, the surface pressure change of the seals S1 and S2 becomes gradual with respect to the compressive load between the respective separators 13 and 14. Therefore there is the effect that differences in the seal stress between the respective fuel cells N can be reduced, assembly of the seals S1 and S2 is facilitated and excellent sealability can be ensured. Moreover, there is the effect that the bending stress on each separator 13 and 14 decreases, and damage of each separator 13 and 14 can be reliably prevented.

Furthermore by making the seals S1 and S2, that is, the seal body SH a circular shape in cross-section, a low compressive load is realized and the ratio of the surface area to the volume of the seals S1 and S2 can be reduced. Therefore there is the effect that durability with respect to heat, such as compressive permanent deformation can be improved.

Moreover, since it is possible to prevent inclining of the seals S1 and S2 by means of the fin F, there is the effect that the linearity of the seals S1 and S2 can be maintained, distortion, slippage and waving at the time of assembly can be eliminated, and alignment of the mounting position is facilitated. Moreover, also in the case where inclining of the seals S1 and S2 occurs, since the compression margin of the seal body SH having a circular shape in cross-section does not change, there is the effect that causes of poor sealing can be eliminated.

Furthermore, since it is possible to identify inclining of the seals S1 and S2 by means of the visually identifiable direction of the fin F, there is the effect that assembly of the seals S1 and S2 can be performed quickly, enabling a reduction of manufacturing time. Moreover, when inserting the seals S1 and S2 into the grooves 38 and 39, insertion can be done by fitting the fins F into the grooves 38 and 39. Therefore there is the effect that the seals S1 and S2 can be inserted appropriately without causing distortion or waving of the seals S1 and S2.

Furthermore, since the fins F are formed, and the tensile strength of the seals S1 and S2 can be increased by this, there is the effect that in the case where adherence to the mold occurs at the time of mold removal after vulcanization molding, even if excessive pulling or stretching is applied at the time of peeling off, occurrence of cuts, cracks and ruptures can be reduced, thereby improving yield.

By setting the width dimension "a" of the grooves 38 and 39 to a range of from 2.0 to 4.0 mm, and the depth dimension "b" to a range of from 0.05 to 1.0 mm, it becomes possible to ensure an appropriate compressibility based on the lower limit of the seal diameter that can be manufactured stably, while ensuring the strength of the anode-side separator 13 and the cathode-side separator 14. Therefore there is the effect that sealability can be ensured without damaging each separator 13 and 14. Moreover, it becomes possible to clear the restriction on the outer peripheral dimension of each separator 13 and 14 and to cope with differences in the minimum seal size. Hence, there is the effect that miniaturization of the fuel cell N becomes possible, and the seals S1 and S2 can be reliably fitted.

Moreover, the seals S1 and S2 are formed of a seal body SH having a circular shape in cross-section and a fin extending from the seal body SH in the width direction of the seals S1 and S2, and the diameter dimension $\phi$ of the seal body SH is set to a range of from 0.5 to 1.6 mm, and the width dimension L of the entire seal is set to a range of from 1.0 to 3.1 mm. As a result, it becomes possible to set the fin in a range that can be identified visually, and the entire seal can be made with a width dimension that allows misalignment at the time of setting the seal. Hence, there is the effect that the seals S1 and S2 can be attached reliably, while visually identifying distortion of the seals S1 and S2.

Figure 21:
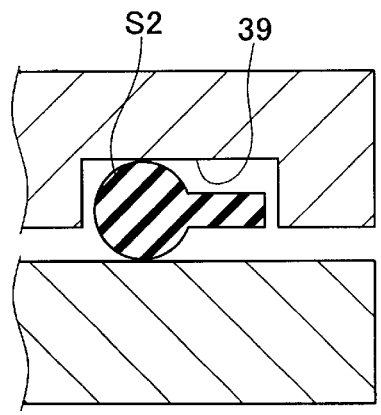
FIG. 21 is a diagram showing an other embodiment of the present invention.

The present invention is not limited to the above embodiment, and for example, as shown in FIG. 21, with regards to the grooves 39 around each communicating hole 22a, 22b, 23a, 23b, 24a and 24b in each anode-side separator 13 and cathode-side separator 14, for which the surface 13a and surface 14a face each other, the grooves 39 may be provided only on one side thereof, so that the seals S2 are closely contacted with the surface 13a or the surface 14a corresponding to the seal S2 in the groove 39, to thereby effect sealing.

Figure 22:
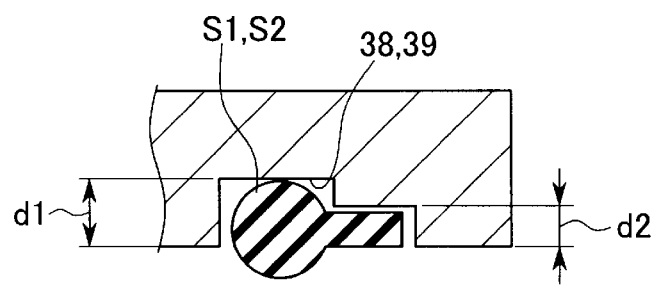
FIG. 22 is a diagram showing an other embodiment of the present invention.
Figure 23:
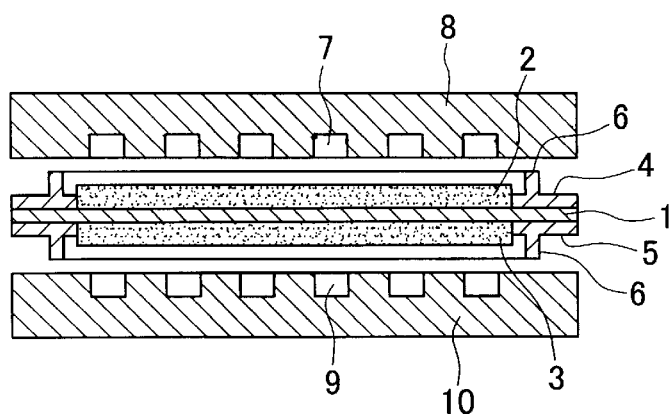
FIG. 23 is an overall sectional view of the prior art.

Moreover, as shown in FIG. 22, corresponding to the parts of the seal body SH and the fin F, the grooves 38 and 39 may have a groove depth of d1 in the part for the seal body SH and d2 in the part corresponding to the fin F. By having such a structure, strength reduction of the separator can be prevented by the amount of the reduced machining of the grooves 38 and 39, and mountability of the seal can be increased.

This can also be applied to where a reinforcing material is provided on the fin F or the seal body SH.

What is claimed is:

1. A fuel cell where an electrode film structure having an anode electrode provided on one side of a solid polymer electrolyte film and a cathode electrode provided on the other side thereof is clamped with a pair of separators, wherein a groove is provided in a separator surface corresponding to the outer peripheral portion of the anode electrode or the cathode electrode, and a seal having a circular shape in cross-section and with a fin is provided in this groove.

2. A fuel cell where an electrode film structure having an anode electrode provided on one side of a solid polymer electrolyte film and a cathode electrode provided on the other side thereof is clamped with a pair of separators, wherein there are provided in said separator, communicating holes for supplying and discharging a reactant gas containing a fuel gas, communicating holes for supplying and discharging a reactant gas containing an oxidant gas and communicating holes for supplying and discharging a coolant, penetrating through said separator, and a groove is provided around the periphery of at least one of the opposing communicating holes, and a seal having a circular shape in cross-section and with a fin is provided in this groove.

3. A fuel cell obtained as one unit by laminating a plurality of sets of electrode film structures having an anode electrode provided on one side of a solid polymer electrolyte film and a cathode electrode provided on the other side thereof, which are clamped with a pair of separators, wherein a coolant channel is formed between separators with backsides abutting each other, and a groove is provided in at least one of the separator surfaces, at a portion surrounding said channel, and a seal having a circular shape in cross-section and with a fin is provided in this groove.

4. A fuel cell obtained as one unit by laminating a plurality of sets of electrode film structures having an anode electrode provided on one side of a solid polymer electrolyte film and a cathode electrode provided on the other side thereof, which are clamped with a pair of separators, wherein there are provided in said separator, communicating holes for supplying and discharging a reactant gas containing a fuel gas, communicating holes for supplying and discharging a reactant gas containing an oxidant gas and communicating holes for supplying and discharging a coolant, penetrating through said separator, and a groove is provided around the periphery of at least one of the opposing communicating holes of the separators of the fuel cell with backsides abutting each other, and a seal having a circular shape in cross-section and with a fin is provided in this groove.

5. A fuel cell according to claim 1, wherein a width dimension "a" of said groove is set to a range of from 2.0 to 4.0 mm, and a depth dimension "b" is set to a range of from 0.05 to 1.0 mm.

6. A fuel cell according to claim 2, wherein a width dimension "a" of said groove is set to a range of from 2.0 to 4.0 mm, and a depth dimension "b" is set to a range of from 0.05 to 1.0 mm.

7. A fuel cell according to claim 3, wherein a width dimension "a" of said groove is set to a range of from 2.0 to 4.0 mm, and a depth dimension "b" is set to a range of from 0.05 to 1.0 mm.

8. A fuel cell according to claim 4, wherein a width dimension "a" of said groove is set to a range of from 2.0 to 4.0 mm, and a depth dimension "b" is set to a range of from 0.05 to 1.0 mm.

9. A fuel cell according to claim 1, wherein said seal is formed of a seal body having a circular shape in cross-section and a fin extending from the seal body in the width direction of the seal, and a diameter dimension $\phi$ of said seal body is set to a range of from 0.5 to 1.6 mm, and a width dimension L of the entire seal is set to a range of from 1.0 to 3.1 mm.

10. A fuel cell according to claim 2, wherein said seal is formed of a seal body having a circular shape in cross-section and a fin extending from the seal body in the width direction of the seal, and a diameter dimension $\phi$ of said seal body is set to a range of from 0.5 to 1.6 mm, and a width dimension L of the entire seal is set to a range of from 1.0 to 3.1 mm.

11. A fuel cell according to claim 3, wherein said seal is formed of a seal body having a circular shape in cross-section and a fin extending from the seal body in the width direction of the seal, and a diameter dimension $\phi$ of said seal body is set to a range of from 0.5 to 1.6 mm, and a width dimension L of the entire seal is set to a range of from 1.0 to 3.1 mm.

12. A fuel cell according to claim 4, wherein said seal is formed of a seal body having a circular shape in cross-section and a fin extending from the seal body in the width direction of the seal, and a diameter dimension $\phi$ of said seal body is set to a range of from 0.5 to 1.6 mm, and a width dimension L of the entire seal is set to a range of from 1.0 to 3.1 mm.

13. A fuel cell according to claim 5, wherein said seal is formed of a seal body having a circular shape in cross-section and a fin extending from the seal body in the width direction of the seal, and a diameter dimension $\phi$ of said seal body is set to a range of from 0.5 to 1.6 mm, and a width dimension L of the entire seal is set to a range of from 1.0 to 3.1 mm.

* * * * *